3,480,572
STARCH RESIN REINFORCED RUBBERS

Russell A. Buchanan and Charles R. Russell, Peoria, Ill., assignors to the United States of America as represented by the Secretary of Agriculture
No Drawing. Filed Jan. 31, 1968, Ser. No. 701,843
Int. Cl. C08d 9/06, 9/10
U.S. Cl. 260—172                           1 Claim

ABSTRACT OF THE DISCLOSURE

High strength white type rubber is produced by milling and vulcanizing the coprecipitate from a preferably synthetic rubber latex that has been fortified by the prior addition per se of certain resol resin components and either gelatinized starch or starch xanthate having a D.S. of about 0.08.

The instant invention is an extension of the invention taught and claimed in commonly assigned copending application S.N. 580,555 of Buchanan et al. wherein it is disclosed that vulcanized white sidewall grade rubber having astonishingly improved mechanical strengths despite the absence of reinforcing carbon blacks or lignin, is obtained by conventionally milling and vulcanizing the crumbs of coprecipitate from a rubber latex that has been augmented prior to coagulation of the latex by the in situ addition of critical proportions of either gelatinized starch or of lowly substituted sodium starch xanthate, which disclosure is hereby incorporated by reference.

DETAILED DESCRIPTION OF THE INVENTION

The instant invention relates to the further discovery that the reinforcement of rubber with gelatinized starch or starch xanthate is additionally improved if the unprecipitated starch-containing rubber latex also contains certain additions of formaldehyde and polyhydroxy member selected from the group consisting of resorcinol, catechol, and pyrogallol, the starch component of the subsequently coprecipitated curds or crumbs thereby reacting with the resol resin type components to become a starch-resin intermediate that then apparently reacts chemically with the rubber molecules under the thermal effects of the mastication and vulcanization operations.

More particularly, this invention relates to an improved manner of compounding latexes of known diene rubbers such as "SBR 2105" (styree-butadiene) and the NBR (acrylonitrile-butadiene), or the carboxylic "Chemigums," Goodyear Tire and Rubber Co., with about 20–45 phr. (parts per hudndred) of a starch member selected from the group consisting of gelatinized cereal grain starch and starch xanthate and, in addition to the starch member based on the dry weight of the starch, from about 5.5 to about 44 total combined weight percent of resol, i.e., A-stage resin type constituents consisting of polyhydroxybenzene reactant selected from the group consisting of resorcinol, catechol, and pyrogallol and, per mol of the dihydroxy-benzene compound, 3 mol equivalents of formaldehyde contained conveniently in commercially available Formalin (38%) solution, whereby the latex solids are quantitatively coprecipitated respectively as white or brownish pink curds upon the addition of $ZnSO_4$ or $Fe_2(SO_4)_3$, and whereby conventional milling and vulcanization of said curds, with or without reinforcing black pigment provides finished pigmented or white rubbers that exhibit still greater stregths than those of the white rubbers described in the above mentioned copending application.

The carrying out of the preferred embodiments of the improved instant invention is illustrated in the following specific examples.

Example 1

A gelatinized starch paste was prepared by continuously stirring 102.3 g. of wheat starch (90 g. dry basis) in 1105 ml. of water plus 9 g. of 50% NaOH solution on a steam bath for a period exceeding the gelatinization point by 30 minutes. The hot alkaline starch paste was then mixed with 312 g. of No. 2105 SBR latex (200 g. dry latex solids), 1.8 g. of 65% styrenated phenol antioxidant, 5.5 g. resorcinol, and 12 g. of 38% Formalin (i.e., 11% total of 1:3 mole ratio resorcinol-formaldehyde based on the dry weight of the starch). About 500 ml. of water was added' and the mixture was stirred for 30 minutes. The pH was then adjusted to the acid side by the addition of about 54 ml. of aqueous solution containing per 100 ml. 23.5 g. of hydrated $Fe_2(SO_4)_3$, which resulted in an essentially quantitative coprecipitation of the solids in the form of filterable curds or crumbs. After drying the crumbs in a forced air oven at 70° C. to a moisture content below 2%, 319 g. of dried crumbs were obtained. The raw crumb rubber was consolidated into a sheet by several passes through a differential roll mill at a nip clearance of 0.01 in., followed by 6 minutes of roll milling through a relaxed nip, the speed of the slower (front) roll being 24 ft./min. to give a shear ratio of 1:1.4. After conventional additions of 2.0 phr. (parts by weight per 100 parts elastomer) of stearic acid lubricant, 5.0 phr. ZnO pigment, 2.0 phr. sulfur, 1.5 phr. octylated diphenylamine antioxidant, 1.5 phr. of 2,2'-dithiobisbenzothiazole, and 0.2 phr. TMTD, the compounded rubber was then press cured at 150° C. to provide test specimens of the vulcanized rubber of the instant invention.

Compared with a tensile strength value of only 440 p.s.i. and a modulus value of 325 p.s.i. at 300% elongation for a control containing neither the gelatinized starch nor the resorcinol-formaldehyde components, the rubber made in accordance with the invention showed a tensile of 2410 p.s.i. and a modulus of 1875 p.s.i. By further comparison, rubber containing an 18 phr. incorporation of gelatinized starch but no resol resin constituents showed a tensile strength of 1320 p.s.i. (It will be understood that the much smaller starch level in the above comparison rubber stems from the fact that 18 phr. is the maximum that coprecipitates in the absence of the resol resin components.)

Example 2

An alkaline gelatinized starch paste having a 7.5% concentration of starch was prepared from 40 g. of wheat starch, dry basis, in the manner shown in Example 1. The hot paste was thoroughly mixed with 312 g. of SBR 2105 latex plus 1.8 g. of octylated diphenylamine emulsion, 2.2 g. resorcinol, and 6.0 g. of 38% Formalin (11% total weight of resorcinol-formaldehyde based on the starch).

The latex mixture was quantitatively coprecipitated by the addition of 35 ml. of aqueous solution containing per 100 ml. of 23.5 g. of hydrated $Fe_2(SO_4)_3$. After filtration and forced air drying, the dried coprecipitate weighed 267 g.

The coprecipitate was milled, compounded, and press molded or cured at 150° C. as in Example 1. The resulting reinforced somewhat brownish rubber having a starch filler loading of 20 phr. was found to exhibit a 600% ultimate elongation, a tensile strength of 2285 p.s.i., and a 685 p.s.i. modulus at 300% elongation.

A comparison specimen containing 25 phr. of SRF Furnace Black as the sole reinforcing agent exhibited an ultimate elongation value of 500%, a tensile strength of only 1500 p.s.i. and a modulus value of 610 p.s.i. at 300% elongation.

Example 3

A mixture was prepared using 508 g. of a 17.83% sodium starch xanthate solution whereof the starch had a xanthate D.S. of 0.08, 312 g. of the same SBR latex used in Example 1, 1.8 g. of the styrenated phenol antioxidant, 5.5 g. of resorcinol, 12.0 g. of Formalin (11% resorcinol-formaldehyde based on the weight of starch), and 1750 ml. water. After 30 minutes of stirring, 145 ml. of the previously described approximately 23.5% $Fe_2(SO_4)_3$ solution was added. The oven dried coprecipitate weighed 330 g., thus evidencing the quantitative coprecipitation of all solids.

The dried coprecipitate was then compounded, masticated and mold cured precisely as in Example 1. The experimental rubber exhibited a tensile strength of 2020 p.s.i. and a modulus of 1680 p.s.i. at 300% elongation whereas identical rubber excepting for the omission of the resorcinol and formaldehyde had a tensile value of only 860 p.s.i. and a 300% elongation modulus of only 715 p.s.i.

Example 4

A dried coprecipitate of resorcinol-formaldehyde treated gelatinized starch and SBR 2105 latex solids identical to that of Example 1 was prepared excepting that the addition of resorcinol was only 2.6 g. while that of the Formalin was 6 g. (constituting a combined 5.5% addition based on the 45 phr. dry starch weight). The solids were precipitated from the latex mixture by the addition of 72 ml. of 25% $ZnSO_4$ solution, and the dried slightly pink coprecipitate weighed 330 g. The coprecipitate was milled with the additives set forth in Example 1 plus sufficient ZnO to give a total zinc value of 40 phr. calculated as ZnO, plus $TiO_2$ equivalent to 50 phr., plus 0.1 phr. of blue organic dye. Despite the weakening effect of the inordinately large incorporation of white pigments, specimens of the so formulated white rubber press cured at 150° C. were found to exhibit a tensile value of 1265 p.s.i., a 300% elongation modulus value of 705 p.s.i., an ultimate elongation value of 660% and an ASTM–D624 "tear" value of 106 lb./in. By comparison, a black SBR rubber reinforced exclusively with 25 phr. of conventional SRF Black had a tensile strength of 1500 p.s.i., a modulus of 610 p.s.i., and an ultimate elongation value of 500%. The above white rubber of our invention also is much stronger than the white SBR rubber loaded with a closely comparable (148.4 phr.) proportion of finely divided $CaCO_3$ particles as described on p. 260 of the Vanderbilt Rubber Handbook (copyright 1958; R. T. Vanderbilt Co., New York, N.Y.) of which the tensile strength is 1100 p.s.i., the 300% modulus is 320 p.s.i., and the ultimate elongation is 610%.

Example 5

102.3 g. of air-dried wheat starch (90 g. dry basis) was gelatinized in 1105 ml. of water plus 9 g. of 50% NaOH in the manner of Example 1. The hot alkaline starch paste was then stirred with 312 g. of SBR 2105 latex (200 g. solids) plus 1.8 g. of 65% styrenated phenol emulsion, and 500 ml. of water. The mixture had a starch concentration in the aqueous phase of 7.3% as in Example 1. Catechol, 11.0 g., and Formalin, 32.5 g. (equivalent to a combined resol component value of 26 phr.) were added and mixed therewith. A quantitative (331 g.) coprecipitation after the addition of the antioxidant, etc. was achieved with $Fe_2(SO_4)_3$. A virtually identical coprecipitation was obtained with pyrogallol in place of the catechol, but very incomplete coprecipitations were obtained when phenol or cresol was used in place of the highly reactive polyhydroxybenzene compounds. Also, as indicated below, the compounded vulcanizates in which phenol or cresol was used in place of a polyhydroxybenzene compound were markedly inferior in strength to the rubbers of the invention, perhaps because of the markedly lowered extent of starch that actually coprecipitated with the rubber solids.

Thus, the catechol-containing cured rubber had a tensile strength of 2320 p.s.i. while that of a rubber prepared with pyrogallol was 2410 p.s.i. By contrast the tensiles for rubber prepared with phenol or cresol were, respectively, 970 p.s.i. and 670 p.s.i. Similarly, whereas the catechol modulus was 1740 p.s.i. and the pyrogallol rubber modulus was 1660 p.s.i., the respective values for the phenol and cresol analogs were 650 p.s.i. and 460 p.s.i.

While the inherently much higher tensile strength of natural rubber is not greatly increased by the incorporations according to the invention, the modulus is markedly improved.

A nonexclusive, irrevocable, royalty-free license in the invention herein described, throughout the world for all purposes of the United States Government, with the power to grant sublicenses for such purposes, is hereby granted to the Government of the United States of America.

We claim:

1. Vulcanized synthetic diene rubbers containing no furnace black reinforcing agent and characterized by tensile strengths in the range of 1265 p.s.i. to about 2400 p.s.i. and by 300% modulus values of 685 p.s.i. to 1875 p.s.i., said rubbers being the product obtained by compounding and then vulcanizing the dewatered curds coprecipitated by the addition of an acidifying salt selected from the group consisting of $ZnSO_4$ and $Fe_2(SO_4)_3$ to a synthetic rubber latex also having dispersed therein about 45 parts based on the weight of the rubber solids of a starch member selected from the group consisting of alkali-gelatinized starch and sodium starch xanthate having a xanthate D.S. of about 0.08 and in a 1:3 mole ratio a polyhydroxybenzene member selected from the group consisting of resorcinol, catechol, and pyrogallol and sufficient formaldehyde solution to conform to the said mole ratio, the combined unreacted weights of the resol resin-type components being from about 5.5 to about 44 parts by weight per 100 parts dry weight of the starch member.

References Cited

UNITED STATES PATENTS

| | | | |
|---|---|---|---|
| 3,113,605 | 12/1963 | Fuetterer | 152—211 |
| 3,247,135 | 4/1966 | Doughty | 260—17.5 |
| 3,296,158 | 1/1967 | Dimitry | 260—17.5 |
| 3,312,643 | 4/1967 | Ball | 260—17.5 |

WILLIAM H. SHORT, Primary Examiner

E. NIELSEN, Assistant Examiner

U.S. Cl. X.R.

152—353; 260—17.4, 29.7